United States Patent
Wiederhold

(12) 
(10) Patent No.: US 6,226,745 B1
(45) Date of Patent: May 1, 2001

(54) INFORMATION SHARING SYSTEM AND METHOD WITH REQUESTER DEPENDENT SHARING AND SECURITY RULES

(76) Inventor: Gio Wiederhold, 155 Marine Rd., Woodside, CA (US) 94062

( * ) Notice: Subject to any disclaimer, the term of this patent is extended or adjusted under 35 U.S.C. 154(b) by 0 days.

(21) Appl. No.: 09/040,522

(22) Filed: Mar. 16, 1998

Related U.S. Application Data

(60) Provisional application No. 60/041,444, filed on Mar. 21, 1997.

(51) Int. Cl.[7] ........................................................ G06F 12/14
(52) U.S. Cl. .................................................. 713/200; 707/9
(58) Field of Search ................................ 713/200, 201; 710/240, 243, 42; 706/47, 45, 50, 60; 707/1, 9

(56) References Cited

U.S. PATENT DOCUMENTS

| | | | | |
|---|---|---|---|---|
| 5,265,221 | * | 11/1993 | Miller | 711/163 |
| 5,355,474 | * | 10/1994 | Thuraisngham et al. | 707/9 |
| 5,446,903 | * | 8/1995 | Abraham et al. | 707/9 |
| 5,481,700 | * | 1/1996 | Thuraisngham | 707/9 |
| 5,694,590 | * | 12/1997 | Thuraisngham et al. | 707/9 |
| 5,787,428 | * | 7/1998 | Hart | 707/9 |
| 5,826,268 | * | 10/1998 | Schaefer et al. | 707/9 |
| 5,859,966 | * | 1/1999 | Hayman et al. | 713/200 |
| 5,966,715 | * | 10/1999 | Sweeney et al. | 707/9 |

OTHER PUBLICATIONS

"Security and Inference in Multilevel Database and Knowledge–Base Systems", Mathew Morgenstern, Proceedings of the 1987 ACM SIGMOD Annual Conference on Management of Data. pp. 357–373, 1987.*

"Toward a Multilevel Secure Relational Data Model", Sushil Jajodia and Ravi Sandhu, Proceedings of the 1991 ACM SIGMOD International Conference on Management of Data. pp. 50–59, 1991.*

"Rule based Database Access Control—A Practical Approach", Tor Didriksen, Proceedings of the Second ACM Workshop on Rule Based Access Control. pp. 143–151, 1997.*

"Oracle8i Fine–Grained Access Control", Oracle Corp., Redwood Shores, CA, Feb. 1999.*

"Database Security in Oracle8i", Oracle Corp., Redwood Shores, CA, Feb. 1999.*

* cited by examiner

*Primary Examiner*—Robert W. Beausoliel, Jr.
*Assistant Examiner*—Pierre Eddy Elisca
(74) *Attorney, Agent, or Firm*—Pennie & Edmonds LLP

(57) ABSTRACT

A security mediator system is used in a computer system having a database of information to be shared with authorized users in accordance with pre-defined constraints. A rules database stores rules, including query pre-processing rules and query results post-processing rules. The rules database includes data for specifying, for each of a plurality of specified groups of users, which of the rules in the rules database are applicable to queries received from users in each of the groups. A query pre-processing module applies to each received query all pre-processing rules in the rules database applicable to the query in accordance with the identified user who submitted the query. If any applicable rule is not passed, the query is blocked; otherwise execution of the query is enabled. A database access module executing each enabled query to produce a corresponding result. A post-processing module applies to the results all post-processing rules in the rules database applicable to the executed query. If any applicable rule is not passed, transmission of the results is blocked; otherwise transmission of the results to the identified user is enabled. A security officer module processes blocked queries and blocked results, enabling a security officer to review blocked queries and blocked results, and to either confirm the blocking determination or override it.

15 Claims, 2 Drawing Sheets

100 — Security Mediator Data Structures

| Set Up Rules |
| --- |
| Query Processing Rules |
| Result Processing Rules |
| Defined Dictionaries |
| UserGroup Definitions |
| Log Files (one for each UserGroup) |
| . . . |
| |

FIG. 3

200 — Security Mediator Procedures

| Security Officer Procedures | |
| --- | --- |
| | Rule Definition Proc. |
| | Rejected Query Handling Proc. |
| | Rejected Result Handling Proc. |
| | . . . |
| Query Processing Proc. | |
| Result Processing Proc. | |
| Database Access Proc. | |
| Log File Writing Proc. | |
| . . . | |

FIG. 4

INFORMATION SHARING SYSTEM AND METHOD WITH REQUESTER DEPENDENT SHARING AND SECURITY RULES

CROSS-REFERENCES TO RELATED APPLICATIONS

This application claims priority on and incorporates by reference in its entirety U.S. provisional patent application No. 60/041,444, filed Mar. 21, 1997.

The present invention relates to security systems for limiting or controlling access to information in a computer system, and more particularly to a security mediator system for sharing information stored in a computer system among collaborators in accordance with one or more sets of information sharing rules.

BACKGROUND OF THE INVENTION

When some information must be shared among collaborating, but distinct, enterprises security to protect against excessive release must be achieved. Collaborating enterprises cannot fully share their data and information resources, although some information exchange is essential.

To address collaboration one must address a specific gap which exists in the current model of security management, which consists of authentication, authorization, access certification, and presenting the information that is the result from the access execution to an authenticator requester. In most practical enterprises it is unlikely that the partitioning used to organize data for internal storage and retrieval will match the structure of access rights given external requestors, unless a very simple model (say: open, secret, top secret) is used and rigorously employed.

Exchange of information is being enabled by rapidly growing communication networks. Such communications are moving inexorably towards automation, but needs for security when collaborating are inadequately served. The focus of security research and current systems is on infrastructure improvements. Communication links are being secured, authentication of users is being improved, and fences (firewalls) around protected domains are being erected, so that enterprises can be protected against actions by enemies.

However, little thought is being given on how to protect information selectively when the accessors we are dealing with are legitimate but diverse, and their legitimate rights to information overlap. These access rights then form a complex web, which will not match the capabilities of the record systems used to enter, store, use, and maintain the information.

Ideally, the information flow among collaborating enterprises would by protected by both automated and manual systems for:
1. maintaining a perfect data organization to deal with external requests;
2. providing assurance that no piece of data is ever misfiled in the computer systems being accessed.
3. avoiding erroneous interpretation of access rights where requesters have multiple, intersecting rights;
4. preventing system software failures that might cause erroneous access rights to be assigned;
5. preventing human or system software errors that cause erroneous authorizations to be assigned;
6. preventing purposeful misfilings that would give an external requestor excessive information;
7. bonding database system staff to reduce the risk of loss due to mishandling of data; and
8. manual record-keeping to track the release of information out of an enterprise.

However, these requirements are so onerous that many enterprises either ignore them, at substantial risk, or build replicated data systems when collaboration is needed. It is a goal of the present invention to avoid or greatly mitigate the above requirements.

Examples of enterprises that must collaborate include:
Hospitals with public health agencies;
Hospitals with insurance companies;
Hospitals with suppliers and distributors;
Factories with suppliers, forming virtual enterprises;
Factories with distributors and shipping companies;
Military commanders with shipping companies.

Individuals and institutions in these settings must share information so they can collaborate. In large organizations, such as the military, substantial internal collaboration takes place. In many organization, not all groups have common access rights, although little secure protection is afforded by systems within an enterprise. However, there are often are (or should be) requirements for protecting internal collaboration in settings such as:

Medical records departments with physicians;
Medical records departments with billing clerks;
Factory design departments with external sales staff;
Military commanders with intelligence resources;
Military commanders with troops in the field.

There have been handcrafted systems built to deal with specific collaborations. However, when unusual or emergency cases occur their operation is bypassed, and needed information is passed sub-rosa, and such transmissions are rarely logged. Violations in all cases require tedious investigations and information leakage is often a mystery.

Thus, the problem of how to enable selective sharing of information with collaborators, without the risk of exposing related information in one's enterprise domain or enclave that needs to be protected. The following are some examples to clarify the problem.

In a hospital the medical record system collects a wide variety of information on its patients. Most information on a patient must be accessible to the treating health care personnel, including community physicians, and a substantial fraction of the information must be available to the hospital billing clerks. Similar data are requested by insurance companies, and certain data and summarization information are required for hospital accreditation and public health monitoring. Information sharing with each of these groups must be handled distinctly.

In a manufacturing company collaborations are often formed with suppliers and marketing organizations. Such virtual enterprises are formed to design, assemble, and market some specific products. Design specifications and market intelligence must be rapidly shared to remain competitive. These collaborations overlap, producing security problems which are stated to be the primary barrier to the acceptance of this approach. Uncontrolled sharing of proprietary data is too risky for a manufacturer to grant a supplier. The supplier will also be wary of giving information to the customers.

In a joint military action situation, information must be shared from a variety of sources with a variety of forces, one's own and allies'. The source information ranges from current force status, logistics backup, to intelligence about the opponents. While opponents should be denied all information, not all of one's troops are authorized to access intelligence sources, and one's allies may be further restricted.

These three scenarios have the following commonality.
1. We are dealing with friends, not enemies, and should provide relevant information expeditiously.
2. The collected information is not organized according to the needs of a security protocol.
3. It is impossible to rigorously classify the data, a priori, by potential recipient.
4. It cannot be fully determined from the queries submitted by potential recipients whether the results will including information that should be withheld.

For instance, a medical record on a cardiac patient can include notations that would reveal a diagnosis of HIV, which should not be widely revealed, and (it is assumed here) should withheld from cardiology researchers. A design document on a plastic component, to be outsourced, also indicates the incorporation of a novel component supplied by another manufacturer, which provides a competitive advantage. Military planning information indicates intelligence sources that are not to be made public to one's allies.

SUMMARY OF THE INVENTION

The present invention provides a new mechanism, called a security mediator, that formalizes the role of a security officer who has the responsibility and the authority to assure that no inappropriate information leaves an enterprise domain. A firewall protects the domain vis-a-vis invaders. Distinct gateways, each owned and controlled by a security officer, provide the only legitimate pathways out of, and into, the domain. This gateway is best envisaged as a distinct computer system; we refer to such a system as a security mediator, as depicted in FIG. 1. In the security mediator, the policies set by the enterprise on security and privacy are implemented, under control of, and through interaction with the security officer. Databases and files within the domain can provide services and meta-data to help the activities of the security mediator, but cannot be fully trusted.

Security mediators are computing modules, comprised of software, hardware, and an interface for the enterprise security officer that are interposed in the information flow among collaborating enterprises. Rules in the software of a security mediator define the release policies for enterprise information. If both collaborating enterprises wish to protect their data, they may each choose to have a security mediator, a security officer, and rules that implement their specific policies.

A unique aspect of the security mediator approach is that retrieved results are validated before transmission of the retrieved information to the requestor. The security mediator software and hardware is of modest size and uses rules, so that it can be easily adjusted to support the policies of the collaborating enterprises. Since automation can never resolve all questions of access, all instances where automated rules are inadequate are displayed to a human security officer for resolution. The security officer is advised when the rules indicate a possible violation, and can, if appropriate, override the rules and permit release of any or all the information requested. Having a human in the loop to deal with exceptions also provides a mechanism for dealing with emergencies in a disciplined way, which is certainly essential in certain medical and military situations. The security mediator also provides a log so that patterns of either too stringent or too liberal policies can be recognized and the rule system can be adjusted accordingly.

The security mediator must be itself secure and reliable. Being able to concentrate security in a modest, autonomous hardware and software module is an important aspect of the security mediator approach. Giving the responsibility for security and privacy protection to a designated security officer, rather than adding it as a secondary responsibility to the tasks of a database or a network administrator, is another important aspect of the security mediator concept which improves control and manageability.

The concept of having a security mediator does not replace existing security technologies, such as public key encryption for authentication, authorization records to define who is allowed to access what, how, and when, encryption for secure transmission, or firewalls to protect information within a domain. Instead it provides a reliable portal which can use these technologies for collaboration.

BRIEF DESCRIPTION OF THE DRAWINGS

Additional objects and features of the invention will be more readily apparent from the following detailed description and appended claims when taken in conjunction with the drawings, in which:

FIG. 3 is a block diagram depicting a set of data structures used by a security mediator.

FIG. 4 depicts the set of procedures used by the security mediator.

DESCRIPTION OF THE PREFERRED EMBODIMENTS

While the present invention is described below with reference to a few specific embodiments, the description is illustrative of the invention and is not to be construed as limiting the invention. Various modifications may occur to those skilled in the art without departing from the true spirit and scope of the invention as defined by the appended claims.

Figure 1:
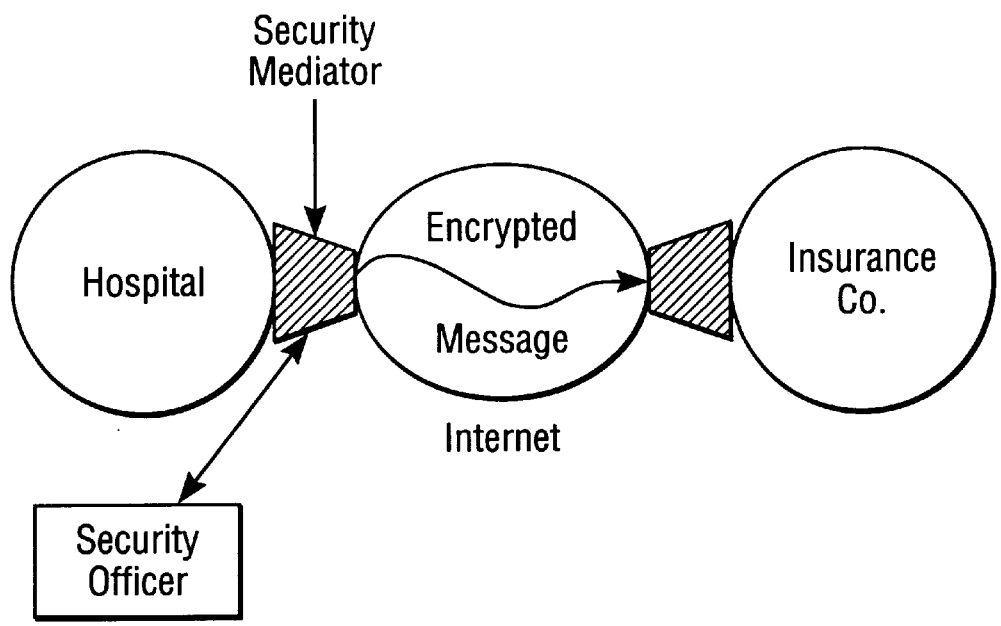
FIG. 1 is a conceptual diagram showing a typical context in which a security mediator, in accordance with the present invention, may be used.
Figure 2:
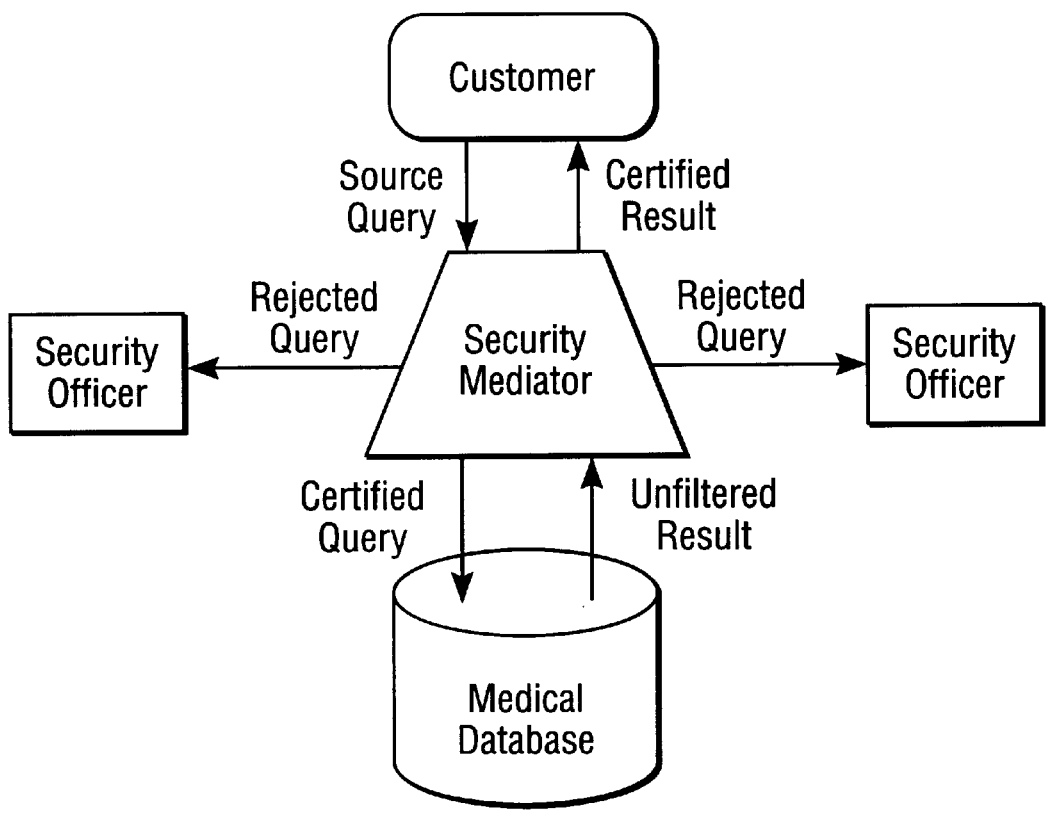
FIG. 2 is a data flow diagram depicting informational flows with respect to a system using a security mediator, in accordance with the present invention.

Referring to FIG. 2, validation of communication content must occur both with respect to both queries (i.e., requests for information) and the responses. For instance, it is inadequate to allow a validated researcher in cardiac diseases to receive all records on cardiac patients, if that also includes HIV cases. Depending on institutional policy, such cases will be omitted or sanitized.

Referring to FIG. 4, the mediator system consists of modules that perform the following tasks:
  Processing of query (pre-processing);
  Communication with databases (submission of query and retrieval of results);
  Processing of results (post-processing);
  Writing into a log file.

The mediator is designed to safeguard the privacy of the data. There is a two-way "fence" inside the mediator that intercepts queries coming in and, likewise, results going out. Corresponding to each side of the fence is a set of rules that assesses the legitimacy of queries and results respectively. When a query is sent by a user from the outside world, the mediator applies a set of rules to ensure the query's validity. For example, in a medical application, depending on the source of a query, the query processing rules utilized by the mediator may block queries requesting patient names, social security numbers, and other patient confidential information.

The rule system permits fully validated requests and/or validated responses to pass without direct interaction by the security officer, but any other request or response will be presented to the security officer. The security officer then decides whether the request can still be granted. If the results of a query are rejected for rule violation, they are sent to the security officer along with the query and the identity of the user who originated it. If a result should contain information that is questionable, then it is passed to the security officer, who can approve it, edit it prior to approval, or reject it.

Referring to FIG. 3, the rules in the rules database are preferably set up so as to balance the need for preserving data privacy and for making data available. Data which is too tightly controlled would be less available and useful for outside users. Conversely, a sufficient level of protection of data privacy must be maintained.

The mediator system can operate fully interactively or partially automatically. A reasonable goal is the automatic processing of say, 90% of queries and 95% responses, but even a fully manual system will provide benefits, as summarized in the conclusions. Even when operating automatically, the security mediator remains under the security officer's control. It does not function like a "black box" but rather keeps the security officer involved in its operation. For example, rules are modifiable by the security officer at all times. In addition, daily logs are accessible to the officer, who can then keep track of the transactions.

The mediator system and the databases typically reside on different machines. Thus, since all queries are processed by the mediator, the database need not be multi-level secure unless it operates in a particularly high security setting.

The Rule System

In order to automate the process of controlling access and ensuring the security of information, the security officer must enter rules into the system. The security mediator uses these rules to determine the validity of every query and make decisions pertaining to the dissemination of information. The system helps the security officer enter appropriate rules and update them as the security needs of the organization change.

The rules are preferably simple, short and comprehensive. They are stored in the rules database with all edit rights restricted to the security officer. If no rules are entered into the database, then the system operates in the manual default mode, whereby access is still possible but all queries and responses pass via the security officer. Some rules may be related to others, in which case the most restrictive rule automatically applies. The rules may pertain to users, sessions, tables or any combinations of these.

The UserGroup definitions in the rules database each include data indicating which of the set up rules, pre-processing rules and post processing rules apply to that UserGroup.

Once the rules are entered into the system by the officer, all the rules applicable to a particular user will be checked for every query issued by that user in every session. All applicable rules will be enforced for every user and the query will be forwarded only if it passes all tests. Unless a rule permits explicit pass through, it goes to the security officer. In the event a rule is violated by a query, the error message will be directed to the security officer and not to the end user. Thus, in such cases, the users will not see the error message. This is necessary because even error messages could be interpreted and meaningful inferences could be made, or the user could rephrase the query to bypass the error. The errors as well as all queries will be logged by the system for audit purposes.

Because the results retrieved for a given query can be highly unpredictable, it is not sufficient to validate queries. Thus, even when the query has been validated, the results are also subject to screening by a set of rules. As before, all rules are enforced for every user and the results are accessible only if they pass all tests. Also, if the results violate a rule, an error message is sent to the security officer but not to the user.

Not only are the rules easy to comprehend and to enter into the system, they are also powerful enough to enable the officer to specify requirements and criteria accurately, so that whenever users may see all information, they should be allowed to do so and whenever information is restricted, they should not have access to it. The users in the system are grouped and rules may apply to one or more user groups. The security officer has the authority to add or delete users from user groups and to create or drop user groups. Similarly, columns in tables can be grouped into segments and query/result validations can be performed on segments.

The rules can be classified as set-up or maintenance rules, pre-processing (query) rules and post-processing (result) rules. Some rules may be both pre-processing and post-processing rules. Examples of pre-processing rules include number of queries per session for a user in the user group, session time, session hours, and limiting requests to statistical queries only. Examples of post-processing rules include rules restricting the number of database rows retrieved, session time, intersection of queries, user hours, and importantly, vocabulary matching.

One type of post-processing rule is to verify that the results retrieved contain only words found in a specified dictionary. The results are checked by running the equivalent of a spell checker on the results using the dictionary specified for the applicable UserGroup. If one or more words in the results are not found in the dictionary, the results are forwarded to the security monitor, with the non-matching words highlighted for his/her review. As indicated, multiple dictionaries can be defined. Each UserGroup can be assigned a specific one of the dictionaries for filtering results; some UserGroups can be assigned no dictionary, in which case results are not checked against any dictionary.

A list of exemplary rules can be found in Table 1. The rule type (Set Up, Preprocessing, or PostProcessing) of each rule in Table 1 is indicated in parenthesis.

Application of rules

The following sequence of actions is applied to every request.

When the user enters a query, the mediator parses the query. If parsing is not successful, an error message is sent out to the security officer.

Next, the security mediator checks to see if the user belongs to an established user group. If not, an error message is sent to the security officer.

Then, the security mediator checks to see if access to all the columns specified in the SELECT and WHERE clauses in every segment of the request is permitted to the members of the user group. If not, an error message is sent to the security officer.

The security mediator then looks at every rule in the system of type "pre-processing" that is applicable to the user's user group, and validates the query against each such rule. If any rule is violated, an error message is sent to the security officer.

At this point, the query is actually processed and results are obtained by the mediator. Then post-processing rules are applied, as follows:

On textual results, rules may specify that all words must come from a specified vocabulary. Any unknown term will be presented, with surrounding context, to the security officer, and if not approved, no result will be returned.

Security officers can edit documents brought to their attention before releasing them. Editing can include "whitening-out" portions of text, graphics and other drawings.

Lastly, further result modification can be performed automatically by the security mediator, as specified by the rules. Operations that can be invoked include random falsification of data and aggregation.

Then the results are sent back to the user.

The security mediator updates internal statistics such as the number of queries for the session, and duration of the session. It also updates the log files appropriately. This last step is done in all cases, whether or not there were errors.

View-Based Access Control

Most databases in place today were originally developed for internal use only. The security mechanisms available in these systems are intended for access by only a known, controllable, observable, and predominantly loyal internal user population, rather than unknown, unseen, and potentially adversarial external user populations. Consequently, while internal access control based on user discretion might be satisfactory, external access control should support mandatory enforcement, before an enterprise can comfortably share its data with other partners in a collaboration.

Notice that the tables referred to in the rules do not have to be base relations. They can be derived relations or views defined by arbitrary SQL queries. Hence, the set of rules collectively specifies a view-based access control policy.

Views in relational databases have long been considered ideal as the objects of access control, because they have a higher degree of logical abstraction than physical data and hence enable content-based or context-based security, as opposed to container-based security provided in operating systems.

View-based access control in relational databases was first introduced in IBM's System R, in which views expressed in SQL are the objects of authorization. It has been adopted by most commercial relational DBMS's. However, view-based mandatory access control has not been in wide-spread use because of the safety problem. The safety question asks the following. Is there a database state in which a particular user possesses a particular privilege for data in a specific view? In container-based access control, different containers do not share information content. Hence, a secret label on a container guarantees that data in the container are not accessible to unclassified users. In view-based access control however, views might overlap because the same data might be included in more than one view. Hence, a secret label on a view does not guarantee that data contained in the view are not accessible to unclassified users.

To support view-based mandatory access control, queries have to be analyzed and answers have to be filtered to ensure that data in a view are accessible by only those users who are authorized to access the view. We will next consider two types of query analysis.

1. Analysis of single queries. A query should be sufficiently constrained such that it only accesses those views to which the issuer of the query has authorization.
2. Analysis of a sequence of queries. A sequence of queries by the same issuer should be sufficiently constrained such that the issuer cannot compute, from the sequence of answers, data in views to which he does not have authorization.

Single Queries

The easiest way of enforcing mandatory access control is of course to require that a query be formulated in terms of those views to which the issuer of the query has authorization. For example, suppose that the following view is defined:

CREATE VIEW=Drug_Allergy (patient_name, drug_name, notes)
SELECT Patients.name, Drugs.name, Allergy.text
FROM Patients, Drugs, Allergy
WHERE Patients.id=Allergy.patient_id
AND Drugs.id=Allergy.drug_id on which the following rules are specified:

CREATE UserGroup=X
ADD USER John_Doe to X
LIMIT X Drug_Allergy.

Then queries issued by user John Doe have to be formulated in terms of the view Drug_Allergy. For example, the following query by John Doe will be rejected by the security mediator, SELECT=Patients.name, Allergy.text
FROM Patients, Drugs, Allergy
WHERE Patients.id=Allergy.patient_id
AND Drugs.id=Allergy.drug_id
Drugs.name=xd_2001 even though it is equivalent to the following query, which will be accepted by the security mediator:

SELECT=patient_name, notes
FROM Drug_Allergy
WHERE drug_name=xd_2001.

Therefore, the security mediator should not base an acceptance decision regarding a query on the condition that the issuer of the query has authorization to all relations mentioned in the query, base or derived. Instead, the security mediator should try to reformulate the query using those views that the issuer of the query has authorization to use. If a reformulation is possible, then the reformulated query will be evaluated in place of the original query. Otherwise the original query is rejected. This approach also facilitates the evolution of the security policy enforced by the security mediator.

Sequence of Queries

Access control on a per-query basis might not be sufficient. Even when a user has authorization to every query issued, he might be able to combine answers from a sequence of queries to derive data in a view to which he does not have access authorization. Such scenarios necessitate the need for the security mediator to keep track of the access history for every user. For example, even if user John Doe is not authorized to access the view Drug_Allergy, he could issue the following two queries, assuming that he is authorized to obtain data contained in the view Drug_Allergy:

SELECT=Allergy.patient_id, Allergy.drug_id,
Patients.name, Allergy.text
FROM Patients, Allergy WHERE Patients.id=Allergy.patient_id.
SELECT=Allergy.patient_id, Allergy.drug_id,
   Drugs.name, Allergy.text
   FROM Drugs, Allergy
   WHERE Drugs.id=Allergy.drug_id.

A critical issue in analyzing a sequence of queries is what we can assume about the computational capability of the user in combining the sequence of answers. For the above example, John Doe has to be able to perform a join over the answers of the two queries in order to compromise the view Drug_Allergy. A reasonable assumption is that users have the same computational capability as in single queries. In other words, if users can issue project-select-join queries, then they can perform project, select, and join operations on a sequence of answers.

Another important problem is when queries are interleaved with updates, because even though John Doe might have already accessed a portion of the data in the view Drug_Allergy, say the first query above, enough time might have elapsed before he issues the second query above that the join between the two answers is empty. This could happen if for example the base relation Allergy only contains data for the most recent month, and John Doe waited over a month to ask the second query. In this case, the history log for queries on relation Allergy could safely be bound to one month.

It can be shown that it is not possible, given a finite amount of computer resources, to program a computer to consider every possible combination of a sequence of queries in order to determine whether the combination of queries allows the requester to obtain information that violates a set of information access rules. However, a reasonable substitute, implemented in the preferred embodiment, is to limit the number of potentially related queries that a user can have answered by a system. Thus, an access restriction rule in the preferred embodiment can limit the number queries any particular user can pose that access any single record in a database within a given period of time. For example, a user might be limited to accessing any particular data record twice during any 30 day period. Other query submission restrictions that can be implemented in the preferred embodiment limit the total number of queries any user can submit against a particular database table, or against an entire database during a particular period of time. These types of query submission restrictions prevent users from retrieving enough information to infer information which they are not allowed to access directly.

Conclusions

The present invention addresses privacy and security maintenance in collaborative settings, where information has to be selectively protected from colleagues, rather than withheld from enemies. The problem only arises once a basic secure infrastructure is established. Today, privacy protection in healthcare is preached, but ignored in practice, putting many institutions at risk. In crucial settings, corporate and military security officers control input and output, but do so on paper, so that interactions are typically delayed by weeks, and high costs are incurred due to delays and misunderstandings. The primary barrier to the realization of virtual enterprises is Insufficient security controls. The corporations participating in a virtual enterprise are independent and frequently compete against one another.

The approach we are developing provides tools for a security officer. Database systems have provided tools to control queries, under the aegis of the database administrator. We illustrated above that query-only tools are inadequate in complex settings, and we emphasized the need for view-based access control. In addition, the major role of a database administrator is to help customers get maximal relevant data, a task that often conflicts with security concerns. Furthermore, the majority of data is not in database systems that provide security, and even less resides in costly, validated multi-level secure systems.

The concept of a security mediator as an intelligent gateway protecting a well-defined domain is clear, simple, and the cost of modern workstations make it feasible to assign such a tool to a security officer. Like most security measures, the security mediator cannot offer a 100% guarantee, especially with respect to statistical data security. But having a focused node, with a complete log of requests and responses, and an incrementally improving rule collection, provides a means to ratchet protection to a level that serves the enterprise needs and policies effectively.

The present invention can be implemented as a computer program product that includes a computer program mechanism embedded in a computer readable storage medium. For instance, the computer program product could contain the program modules shown in FIG. 4. These program modules may be stored on a CDROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, in one alternate embodiment, all of the security rules in the rule are applicable to all users who access the information database via the security mediator. That is, all the defined query processing rules are applied to all queries and all the result processing rules are applied to all query results. The only users not subject to query and result processing rules are individuals having access to special ports to the information database in a physically secure location that bypass the security mechanism of the present invention. In such an embodiment, user group definitions are not needed, and the processing of queries and results is somewhat simplified in that all rules apply to all queries and responses.

TABLE 1

Examples of Rules

| Rule | Remarks |
| --- | --- |
| 1. set logfile X (Set up) | The table or path to the log file |
| 2. create UserGroup x (set up) | Create a UserGroup of users called x |
| 3. add user user_name User Group_name (Set up) | add user called user_name to UserGroup_name |
| 4. delete user user_name UserGroup_name (Set up) | |
| 5. drop UserGroup x (Set up) | |
| 6. create segment segment_name (Set up) | |

TABLE 1-continued

Examples of Rules

| Rule | Remarks |
|---|---|
| 7. set stat_only true/false (Pre) | Only statistical info (average, median) allowed |
| 8. set UserGroup stat_only true/false (Pre) | Only statistical info (average, median) allowed for user |
| 9. set segment stat_only true/false (Pre) | Only statistical info (average, median) allowed for queries on given table |
| 10. set user table stat_only true/false (Pre) | Only statistical info (average, median) allowed for user, table combination |
| 11. limit queries_per_session x (Pre) | Number of queries allowed in a session |
| 12. limit userGroup queries x (Pre) | For a given user, number of queries allowed per session |
| 13. limit UserGroup segment (Pre) | limit all users in user group to columns/tables in segment. This specifies explicit pass through of results. |
| 14. set random on/off (Post) | Random falsification of data to be performed or not |
| 15. set random on/off UserGroup (Post) | Random falsification of data to be performed or not for user |
| 16. set random on/off segment (Post) | Random falsification of data to be performed or not for queries on given table |
| 17. set user table random on/off (Post) | Random falsification of data to be performed or not for user/table combination |
| 18. limit min_rows_retrieved x (Post) | Minimum number of matching rows for a given selection criterion |
| 19. limit UserGroup min_rows x (Post) | Minimum rows retrieved for a query by a given user |
| 20. limit segment num_queries x (Post) | Number of queries allowed on a given table |
| 21. limit UserGroup segment num_queries x (Post) | Number of queries allowed on a given table for a given user |
| 22. limit intersection x (Post) | No two queries can have an intersection greater than x rows |
| 23. limit UserGroup intersection x (Post) | No two queries can have an intersection greater than x rows |
| 24. limit segment intersection x (Post) | No two queries on table can have an intersection greater than x rows |
| 25. limit UserGroup dictionary x (Post) | All words in query results must be found in specified dictionary x |
| 26. limit UserGroup database x view y (Pre) | Queries related to database x must conform to specified database view y |

What is claimed is:

1. A security system for use in a computer system having a database of information to be shared with authorized users in accordance with pre-defined constraints, comprising:

a port for receiving queries requesting information from the database;

means for accessing a set of rules, including query pre-processing rules and query results post-processing rules; each query pre-processing rule specifying one or more conditions that must be satisfied by any query to which the rule is applicable; each results post-processing rule specifying one or more conditions that must be satisfied by any results to which the rule is applicable;

a query pre-processing module for applying to each received query all pre-processing rules applicable to the query, for blocking further processing of the query if any of the pre-processing rules applied to the received query are not passed, and for otherwise enabling execution of the received query by a database access mechanism so as to extract information from the database as specified in the query to produce a corresponding result having one or more words; and a post-processing module for applying to the result produced for each executed query all post-processing rules applicable to the result, for blocking transmission of the results if any of the post-processing rules applied to the results are not passed, and for otherwise enabling transmission of the results;

wherein the post-processing rules include at least one rule that compares every word of the result with a pre-defined dictionary of words, and the post-processing module blocks transmission of the result if the result includes any words not in the predefined dictionary of words.

2. The security system of claim 1, wherein each query is submitted by an identified user of the computer system;

the set of rules includes user data for specifying, for each of a plurality of specified groups of users, which of the rules are applicable to queries received from users in each of the groups of users;

the query pre-processing module applies to each received query all pre-processing rules applicable to the query in accordance with the identified user who submitted the query; and the post-processing module applies to the result produced for each executed query all post-processing rules applicable to the result in accordance with the identified user who submitted the corresponding query.

3. The security system of claim 2, further including:

a security officer module for processing blocked queries and blocked results, including instructions reviewing blocked queries and blocked results, and for either confirming the blocking determination or overriding it, in accordance with instructions received from an authorized security officer.

4. The security system of claim 1, further including:

a security officer module for processing blocked queries and blocked results, including instructions reviewing blocked queries and blocked results, and for either confirming the blocking determination or overriding it, in accordance with instructions received from an authorized security officer.

5. A method of constraining access to information in a database in accordance with pre-defined constraints, comprising the steps of:

receiving queries requesting information from the database;

accessing a rules database that stores a set of rules, including query pre-processing rules and query results post-processing rules; each query pre-processing rule specifying one or more conditions that must be satisfied by any query to which the rule is applicable; each results post-processing rule specifying one or more conditions that must be satisfied by any results to which the rule is applicable;

pre-processing each received query by applying all pre-processing rules in the rules database applicable to the query, blocking further processing of the query if any of the pre-processing rules applied to the received query are not passed, and for otherwise enabling execution of the received query so as to extract information from the database as specified in the query to produce a corresponding result having one or more words; and post-processing the result produced for each executed query by applying all post-processing rules in the rules database applicable to the result, blocking transmission of the result if any of the post-processing rules applied to the result are not passed, and otherwise enabling transmission of the result;

wherein the post-processing rules applicable to the result include at least one rule that compares every word of the result with a predefined dictionary of words, and the post-processing step blocks transmission of the result if the result includes any words not in the predefined dictionary of words.

6. The method of claim 5, wherein each query is submitted by an identified user;

the rules database includes user data for specifying, for each of a plurality of specified groups of users, which of the rules in the rules database are applicable to queries received from users in each of the groups of users;

the pre-processing step includes applying to each received query all pre-processing rules in the rules database applicable to the query in accordance with the identified user who submitted the query; and the post-processing step includes applying to the result produced for each executed query all post-processing rules in the rules database applicable to the result in accordance with the identified user who submitted the corresponding query.

7. The method of claim 6, further including:

processing at least a subset of blocked queries and blocked results by passing them to a security monitor for review, and receiving from the security monitor a signal that confirms the blocking determination or overrides it, in accordance with instructions received from an authorized security officer.

8. The method of claim 5, further including:

processing at least a subset of blocked queries and blocked results by passing them to a security monitor for review, and receiving from the security monitor a signal that confirms the blocking determination or overrides it, in accordance with instructions received from an authorized security officer.

9. A computer program product for applying security constraints to database access requests and replies, the computer product comprising a computer readable storage medium and a computer program mechanism embedded therein, the computer program mechanism, comprising:

instructions for storing a set of rules, including query pre-processing rules and query results post-processing rules; each query pre-processing rule specifying one or more conditions that must be satisfied by any query to which the rule is applicable; each results post-processing rule specifying one or more conditions that must be satisfied by any results to which the rule is applicable;

a query pre-processing module for receiving queries requesting information from a database and for applying to each received query all pre-processing rules applicable to the query, for blocking further processing of the query if any of the pre-processing rules applied to the received query are not passed, and for otherwise enabling execution of the received query by a database access mechanism so as to extract information from the database as specified in the query to produce a corresponding result having one or more words; and a post-processing module for applying to the result produced for each executed query all post-processing rules applicable to the result, for blocking transmission of the results if any of the post-processing rules applied to the results are not passed, and for otherwise enabling transmission of the results;

wherein the post-processing rules applicable to the result include at least one rule that compares every word of the result with a predefined dictionary of words, and the post-rocessing module blocks transmission of the result if the result includes any words not in the predefined dictionary of words.

10. The computer program product of claim 9, wherein each query is submitted by an identified user;

the set of rules includes user data for specifying, for each of a plurality of specified groups of users, which of the rules are applicable to queries received from users in each of the groups of users;

the query pre-processing module applies to each received query all pre-processing rules applicable to the query in accordance with the identified user who submitted the query; and the post-processing module applies to the result produced for each executed query all post-processing rules applicable to the result in accordance with the identified user who submitted the corresponding query.

11. The computer program product of claim 10, further including:

a security officer module for processing blocked queries and blocked results, including instructions reviewing blocked queries and blocked results, and for either confirming the blocking determination or overriding it, in accordance with instructions received from an authorized security officer.

12. The computer program product of claim 9, further including:

a security officer module for processing blocked queries and blocked results, including instructions reviewing blocked queries and blocked results, and for either confirming the blocking determination or overriding it, in accordance with instructions received from an authorized security officer.

13. A security system for use in a computer system having a database of information to be shared with authorized users in accordance with pre-defined constraints, comprising:

a port for receiving queries requesting information from the database;

means for accessing a set of rules, including query results post-processing rules; each results post-processing rule specifying one or more conditions that must be satisfied by any results to which the rule is applicable;

a database access mechanism for extracting information from a database as specified in a query to produce a corresponding result having one or more words; and a post-processing module for applying to the result produced for each executed query all post-processing rules applicable to the result, for blocking transmission of the results if any of the post-processing rules applied to the results are not passed, and for otherwise enabling transmission of the results;

wherein the post-processing rules include at least one rule that compares every word of the result with a predefined dictionary of words, and the post-processing module blocks transmission of the result if the result includes any words not in the predefined dictionary of words.

14. A method of constraining access to information in a database in accordance with pre-defined constraints, comprising the steps of:

receiving queries requesting information from the database;

executing a received query so as to extract information from the database as specified in the query to produce a corresponding result having one or more words; and comparing every word of the result with a predefined dictionary of words, and blocking transmission of the result if the result includes any words not in the predefined dictionary of words; and post-processing the result produced for each executed query by applying a set of post-processing rules to the result, blocking transmission of the result if any of the post-processing rules applied to the result are not passed, and otherwise enabling transmission of the result;

the postprocessing step including accessing a rules database that stores a set of rules, including query results post-processing rules; each results post-processing rule specifying one or more conditions that must be satisfied by any results to which the rule is applicable.

15. A computer program product for applying security constraints to database access requests and replies, the computer product comprising a computer readable storage medium and a computer program mechanism embedded therein, the computer program mechanism, comprising:

instructions for storing a set of rules, including query results post-processing rules; each results post-processing rule specifying one or more conditions that must be satisfied by any results to which the rule is applicable;

a database access mechanism for extracting information from a database as specified in a query to produce a corresponding result having one or more words; and a post-processing module for applying to the result produced for each executed query all post-processing rules applicable to the result, for blocking transmission of the results if any of the post-processing rules applied to the results are not passed, and for otherwise enabling transmission of the results;

wherein the post-processing rules applicable to the result include at least one rule that compares every word of the result with a predefined dictionary of words, and the post-processing module blocks transmission of the result if the result includes any words not in the predefined dictionary of words.

* * * * *